United States Patent [19]

Dumm et al.

[11] 4,434,008
[45] Feb. 28, 1984

[54] SUBSTANTIVE PREPARATION MATERIAL FOR YARNS OR PLIED YARNS

[75] Inventors: Heinz Dumm; Götz Koerner; Manfred Krakenberg; Hans Rott; Günter Schmidt, all of Essen, Fed. Rep. of Germany

[73] Assignee: Th. Goldschmidt AG, Essen, Fed. Rep. of Germany

[21] Appl. No.: 361,462

[22] Filed: Mar. 24, 1982

[30] Foreign Application Priority Data

Apr. 18, 1981 [DE] Fed. Rep. of Germany ....... 3115679

[51] Int. Cl.$^3$ ...................... C08L 91/06; C09D 3/393; C09G 1/12
[52] U.S. Cl. ...................................... 106/271; 106/10; 252/311
[58] Field of Search ................... 106/271, 10; 252/311

[56] References Cited

U.S. PATENT DOCUMENTS 2,956,888 10/1960 Gunning ............................. 106/271
3,630,949 12/1971 Brux ................................... 106/271
4,322,302 3/1982 Kleber ................................ 106/271

Primary Examiner—Maria Parrish Tungol
Attorney, Agent, or Firm—Toren, McGeady and Stanger

[57] ABSTRACT

Materials for substantively preparing yarns or plied yarns, especially sewing threads and preferably those of polyester, in the form of an oil/water dispersion are disclosed. The materials contain 5 to 80 weight percent of silicone oil of a viscosity of 500 to 50,000 mm$^2$/sec at 25° C., 10 to 80 weight percent of wax with a melting point not less than 40° C., 1 to 10 weight percent of fatty acids with 6 to 22 carbon atoms, 0.4 to 12 weight percent of cationic imidazolinium salts and 0 to 10 weight percent of ethoxylated fatty amines, dissolved or dispersed in water, the sum of the components having to add up to 100 weight percent. The production of this preparation is also disclosed. The inventive preparation materials have a good and uniform substantivity and bring about uniform reduction in friction over a long length of yarn and for different speeds of the running thread. They ensure little abrasion in the further processing of the yarns, especially during sewing, and at the same time, provide a high measure of antistatic effect. The breaking strength of the yarns or plied yarns is not significantly decreased.

19 Claims, No Drawings

SUBSTANTIVE PREPARATION MATERIAL FOR YARNS OR PLIED YARNS

BACKGROUND OF THE INVENTION

1. Field of the Invention

The invention relates to a material for substantively preparing yarns or plied yarns, especially sewing threads and preferably those of polyester, in the form of an oil/water dispersion and process for the preparation of such materials.

2. Description of the Prior Art

German Offenlegungsschrift No. 21 61 813 discloses the use of mixtures of diorganopolysiloxanes as lubricants for organic fibers. The organic radicals, linked to the silicon have 1 to 5 carbon atoms. Mixtures of diorganopolysiloxanes of different viscosities are used. Even though these mixtures are preferably employed without using purely organic oils and/or waxes or wax-like materials, the simultaneous use of such materials, such as, natural or synthetic oils, paraffin and beeswax may be possible.

German Offenlegungsschrift No. 25 35 768 discloses diorganopolysiloxane lubricants for organic fibers prepared by emulsion polymerization. These are characterized by the fact that they have an average viscosity of 22,000 cSt ($=mm^2/sec$) at 25° C. and are present in admixture with at least one paraffin wax and/or at least one polymer consisting of fluorine atoms and carbon atoms, and, optionally, chlorine atom. Fibers treated with such a preparation should have an improved lubricity and sewability. A typical example of such a preparation consists of a mixture of diorganopolysiloxanes, paraffin wax and polytetrafluoroethylene.

The treatment of sewing thread on bobbins with aqueous baths, which contain 6 to 20 weight percent of organosilicon polymers, is described in German Offenlegungsschrift No. 27 53 200. Pure silicone oils, as well as polysiloxane-polyoxyalkylene block copolymers can be used for this purpose.

German Offenlegungsschrift No. 28 16 196 discloses staple fiber yarns having a uniformly low friction in conjunction with a satisfactory softness. This is achieved by using a wet-paraffinizing material which consists of (in weight percent):

(a) 18 to 40% paraffin, having a melting range of 45° to 60° C.;

(b) 2 to 8% of one or more alkylimidazolines having the formula (I)

$$\underset{R}{\underset{|}{R_2-N^{\oplus}=C}}\overset{CH_2-CH_2}{\underset{N}{\diagup}}(CH_2)_n-O-R_1 \quad X^{\ominus} \tag{I}$$

in which
R represents $C_{12}-C_{22}$ alkyl, alkenyl or hydroxyalkyl,
$R_1$ represents H, $C_1-C_{22}$ aliphatic or aromatic acyl,
$R_2$ represents H, $C_1-C_4$ alkyl or hydroxyalkyl,
n represents numbers from 2 to 6, and
X represents a halogen, $C_1-C_4$ alkyl sulfate, $C_1-C_4$ dialkyl phosphate or $C_1-C_4$ alkyl carboxylate anion;

(c) 1 to 7% of one or more amine oxides having the general formula (II)

$$\underset{R_1}{\overset{R}{\diagdown}}\underset{(CH_2CH_2O)_n-R_2}{\overset{O}{\diagup}} \tag{II}$$

in which
R represents $C_8-C_{12}$ alkyl or alkenyl,
$R_1$ represents $C_1-C_4$ alkyl,
$R_2$ represents H or $C_1-C_4$ alkyl, and
n represents numbers from 0 to 6;

(d) 2 to 9% of an ethylene oxide/propylene oxide block copolymer having the formula (III)

$$H-(C_2H_4O)_y-(C_3H_6O)_x-(C_2H_4O)_y-H \tag{III}$$

in which
x represents numbers from 20 to 40, and
y numbers from 25 to 1000;

(e) 0 to 5% of a polyglycol ether having the formula (IV)

$$R-O(C_2H_4O)_n-H \tag{IV}$$

in which
R represents $C_8-C_{18}$ alkyl or alkenyl, and
n represents numbers from 3 to 12; as well as (f) 0 to 2% of a copolymer of vinylpyrrolidone and vinyl acetate, in which the weight ratio of VP/VAC can vary from 3:7 to 8:2,
with the remainder adding up to 100 weight percent consisting of water.

Practical trials, however, have shown that such known preparations still have various disadvantages. For example, one disadvantage is that uniform preparation of the yarn is not always achieved. As a consequence, the so-called seam length turns out differently. The seam length is understood to be that length of seam, which can be obtained under specified, reproducible conditions before the sewing thread breaks. If the yarns or plied yarns are prepared on bobbins, the inner layers of the bobbins frequently have a different amount of finish from the outer layers of the bobbins.

In other cases, in spite of a sufficiently high and uniform coating, friction values are obtained which are too high and too irregular, causing uneven running during sewing or knitting which leads to frequent machine stoppages. In addition, irregular seam or stitch patterns result. The friction also varies at various speed ranges, which occur, for example, during sewing.

Also, sewing threads of polyester, which are preferred, in the form of single-ply yarns or weakly twisted multi-ply yarns, always exhibit a clear decrease in breaking strength of about 20% after the use of such known substantive paraffin pareparations.

SUMMARY OF THE INVENTION

We have discovered a composition for the substantive preparation of yarns which avoids the aforementioned disadvantages. The composition of the present invention is exhausted substantively and uniformly on the fibers and uniformly reduces the friction over a long length of yarn and for different speed ranges of the running thread. The coefficient of friction is also reduced more than is possible by the methods previously known in the art. In addition, the inventive material also ensures the minimum possible wear during the further processing of the yarn and provides a high measure of antistatic properties. At the same time, a decrease in breaking strength is avoided.

More particularly, the composition of the present invention is an oil/water dispersion which contains, dispersed or dissolved in water:
(a) about 5 to 80 weight percent of a silicone oil having a viscosity of from about 500 to 50,000 mm²/sec at 25° C.;
(b) about 10 to 80 weight percent of a wax with a melting point of not less than about 40° C.;
(c) about 1 to 10 weight percent of fatty acids with from 6 to 22 carbon atoms;
(d) about 0.4 to 12 weight percent of cationic imidazolinium salts; and
(e) from about 0 to 10 weight percent of ethoxylated fatty amines, the sum of components (a) to (e) adding up to 100 weight percent.

DESCRIPTION OF THE PREFERRED EMBODIMENT

Component (a) is a silicone oil with a viscosity of 500 to 50,000 mm²/sec at 25° C. In this connection, a silicone oil with a viscosity of 1,000 to 10,000 mm²/sec is especially preferred. The silicone oil preferably is a methylsilicone oil. A portion of the methyl groups can be replaced by alkyl groups with a longer chain length and/or by phenyl groups. The chain ends of the polysiloxane are generally formed by trimethylsilyl groups. However, dimethylhydroxysilyl groups may also be present. However, these terminating SiOH groups should be present in only a small amount.

The phase which is dispersed or dissolved in water, contains the silicone oil in an amount of from about 5 to 80 weight percent. The proportion of silicone oil in the dissolved or dispersed phase is determined essentially by the nature of the yarn or the plied yarn, which is to be treated with the preparation. If the yarns or plied yarns consist predominantly of thermoplastic polymers, preparations are used with a high proportion of silicone oil. If the yarns consist essentially or at least at their surface of cellulose-containing material, inventive preparations are used whose silicone portion is lowered in favor of the wax portion.

Therefore, for preparing yarns or plied yarns of thermoplastic polymers, inventive materials are preferred whose organic phase contains from about 50 to 85 weight percent of silicone oil and especially from about 70 to 80 weight percent of silicone oil.

If the yarns or plied yarns consist of cellulose-containing materials, inventive preparations are used whose organic phase contains preferably from about 5 to 20 weight percent of silicone oil, and especially from about 8 to 12 weight percent of silicone oil.

Component (b) is formed from a wax, which has a melting point of not less than about 40° C. A typical example of such a wax is slab paraffin melting at from about 40° to 42° C. Especially the higher melting waxes, for example, microwaxes, with a melting point of from about 50° C. to 60° C. are suitable. Especially preferred are waxes with a melting point of more than about 60° C. The concept of waxes is therefore also inventively understood to include the microcrystalline waxes which, however, can then be cut with lower melting paraffins for the purpose of improving the emulsification.

For certain applications, such as, the preparation of yarns of polyester staple fibers, the use of acid or ester waxes is advantageous. They are used by themselves or in admixture with paraffin waxes. Examples of such acid waxes are partially oxidized products, especially those obtained by the Fischer-Tropsch process. Examples of ester waxes are natural and industrial products, such as, carnauba wax or the wax which is commercially available under the name of KPS.

These waxes are present in the organic phase of the preparation material in an amount of from about 10 to 80 weight percent. From the data concerning the amount of silicone oil to be used, it follows that within this region, preparations with a relatively low was content are used for yarns and plied yarns of thermoplastic polymers and preparations with a high wax content for yarns and plied yarns of cellulose.

Component (c) is formed by fatty acids with 6 to 22 carbon atoms. These may be saturated or have double bonds. The fatty acids may also be branched or substituted. Examples of suitable acids are caproic acid, lauric acid, oleic acid, stearic acid, behenic acid, hyroxystearic acid, isotrideconoic acid. In this connection, fatty acids with 18 carbon atoms, such as, oleic acid or stearic acid, are preferred. However, mixtures of these fatty acids or mixtures of fatty acids of different chain lengths may also be used. Mixtures of fatty acids, with varying amounts of fatty acids with 12 to 18 carbon atoms, such as, those obtained, for example, by splitting natural fats and oils, are also suitable. The fatty acids are contained in the oily phase of the preparation in an amount of from about 1 to 10 weight percent. Surprisingly, it was discovered that the fatty acids essentially determine the substantivity of the inventive material.

As particularly effective emulsifiers as well as for achieving good antistatic properties in the finished preparation, cationic imidazolinium salts are used as component (d) and dissolved in the preparation in amounts of from about 0.4 to 12 weight percent, based on the nonaqueous phase. For the preparation of synthetics, from about 2.5 to 6 weight percent are preferably used. Cationic imidazolinium salts are known to those skilled in the art and are described, for example, in the book "Cationic Surfactants," E. Jungermann, M. Decker Publishing House, New York, 1970. These imidazolinium salts carry at least one long-chain hydrocarbon radical as a hydrophobic group. Such imidazolinium salts may correspond to the formula

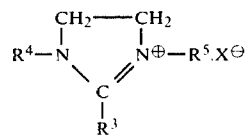

In the above formula, R³ is the long-chain hydrocarbon radical, which may be saturated or unsaturated. It has mostly 10 or more carbon atoms. R⁴ is hydrogen or an alkyl radical. The alkyl radical is preferably short-chained and contains 1 to 5 carbon atoms. The alkyl radical may be substituted and carry a hydroxyl group, particularly at the end of the chain. Preferably, R⁴ is a hydroxyethyl radical. Alkylene oxide, especially ethylene oxide, may be added to the hydroxyl group. R⁵ is a low alkyl radical, and preferably, the methyl or ethyl radical. X is an anionic radical, preferably the halide radical and especially a chloride ion or an anionic group, such as, the

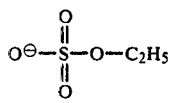

or the acetate group.

As to component (e), up to about 10 weight percent of ethoxylated fatty amines may be contained in the organic phase of the inventive material. These compounds make it easier to emulsify the waxes and silicone oils and, in so doing, also influence the hand and friction. Especially useful are fatty amines with 10 to 22 carbon atoms, ethylene oxide being added to the amine group in such amounts that the compounds become water soluble or at least water dispersible. In the case of stearylamine, from about 5 to 10 moles of ethylene oxide are added. Fatty amine mixtures, such as, coconut oil fatty amine, to which from about 2 to 12 moles of ethylene oxide are added, may also be used.

The inventive materials may be prepared by emulsifying component (a) and component (b) in separate processes. The preferred procedure for producing the inventive preparation is carried out in two separate steps.

In one step, the silicone oil (component a) is emulsified with a portion of the fatty acids (component c) and a portion of the cationic imidazolinium salts (component d). In the second step, the wax (component b) is emulsified with the remaining portions of fatty acids (component c) and of the imidazolinium salt (component d). The inventively obtained dispersions are then mixed together.

Preferably, the silicone oil is emulsified with a portion of the imidazolinium salt and a portion of the oleic acid.

The wax or mixture of waxes is melted separately. The remaining portion of the imidazolinium salt as well as the remaining portion of the fatty acids, and in this connection especially stearic acid, are added to the molten material.

The two dispersions are mixed together and marketed, preferably in the form of the highly concentrated stock solution, which is diluted for use. The concentration of the ready-to-use liquor depends on the add-on desired and on the ratio of liquor to fiber material to be treated for sewing thread. In general, for a 50 weight percent preparation, a 10 g/l liquor is selected for sewing thread and a 0.5 to 1.0 g/l liquor for other yarns.

The inventive preparation materials, their production, as well as the properties of yarns or plied yarns treated with the inventive materials are described in the following examples:

EXAMPLE 1

1. Composition of the Water-Free Active Ingredients

| | | |
|---|---|---|
| a | polydimethyl siloxane (40,000 mm²/sec) | 80 weight % |
| b₁ | hard paraffin, melting point 60°–62° C. | 10 weight % |
| b₂ | ester wax | 3.0 weight % |
| c | oleic acid | 1.7 weight % |
| d | imidazolinium salt having the following formula: | |

-continued

| | | |
|---|---|---|
| | with $R^3$ = heptadecenyl; $X^\ominus$ = $C_2H_5OSO_3^\ominus$ | 3.0 weight % |
| e | ethoxylated coconut oil fatty amine with 5 miles of ethylene oxide | 2.3 weight % |

2. Production of the Inventive Preparation 2.1 Production of the Silicone Oil Emulsion:

A mixture of 15.0 g of component (d), 8.5 g of oleic acid (c), 577.0 g of water and 400 g of silicone oil (a) is emulsified in a gap homogenizer at 250 bar.

2.2 Production of the Wax Dispersion:

Water (487 g) is mixed with 6.0 g of glacial acetic acid and heated to 90° C. A melt consisting of 330 g of component (b₁), 100 g of component (b₂), 77 g of oleic acid (c) and 115 g of component (d) is stirred in with a high-speed stirrer within a period of 20 minutes. The dispersion formed is pumped through a gap homogenizer at 250 bar and cooled.

2.3 The finished stock solution is formed by mixing 660 g of silicone oil emulsion with 100 g of wax dispersion.

3. Application of the Inventive Preparation

A three-ply polyester yarn of metric number 100/3, made from breaking cable, after being dyed and reductively cleared, is left on the dyeing cross spool and prepared as follows in laboratory dyeing equipment:

Stock emulsion (80 g) is added to 800 g of plied yarn and 10 l of water. While circulating the liquor, the temperature is raised to 70° C. during 25 minutes. After this time, the active ingredient is fully exhausted and the clear liquor is discharged.

4. Testing the Material Treated with the Inventive Formulation

Add-on determinations from various layers of the spool gave values between 4.8 and 5.2%.

When drawing off the prepared thread through the guide elements of a double backstitch, high-speed sewing machine at 15 m/min, uniform tension values of 140±5 g are obtained by way of comparison, unprepared thread shows tension fluctuations from 500 to 800 g or thread breakage.

While sewing 14 layers of a cotton fabric with linen binding and an area weight of 300 g/m² at a sewing speed of 500 stitches/min., regular seam lengths of more than 40 cm are achievable without thread break. In comparison with this, unprepared yarn tears after sewing stretches of 2 to 5 cm.

Under the same conditions, a substantive preparation of the state of the art according to Example 1 of German Offenlegungsschrift 28 16 196 gives sewing distances of 7 to 12 cm.

A comparison in which the preparation was employed without using the inventively obtained component (c) (oleic acid), clearly shows the inferior use properties:

| | Active Ingredient of Section 1 | |
|---|---|---|
| | with oleic acid | without oleic acid |
| % exhaustion | 100 | ca. 10 |
| friction (q) | 140 | 250 |

-continued

|   | | Active Ingredient of Section 1 | |
|---|---|---|---|
|   | | with oleic acid | without oleic acid |
| sewing value (cm) | | >40 | 10 |

EXAMPLE 2

1. Composition of the Water-Free Active Ingredients

| a | polydimethyl siloxane (12,5000 mm$^2$/sec) | 15.0 weight % |
|---|---|---|
| b | paraffin, melting point 62°-64° C. | 66.5 weight % |
| $c_1$ | oleic acid | 0.2 weight % |
| $c_2$ | stearic acid | 7.2 weight % |
| d | imidazolinium salt of the formula given in Example 1, with:<br>$R^3$ = alkyl $C_7$ to $C_{17}$<br>(coconut oil derivative)<br>$X^\ominus$ = $CH_3COO^\ominus$ | 11.1 weight % |

2. Production of the Inventive Preparation 2.1 Production of the Silicone Oil Emulsion:

Using 5.3 g of oleic acid ($c_1$) and 15 g of imidazolinium salt (d), 400 g of silicone oil (a) are emulsified in 577 g of water.

2.2 Production of the Wax Emulsion:

A melt of 333 g of wax (b), 36 g of stearic acid ($c_2$) and 53 g of imidazolinium salt (d) is emulsified in 580 g of hot water.

2.3 The finished stock solution is obtained by mixing 100 g of silicone oil emulsion and 533 g of wax emulsion.

3. Application of the Inventive Preparation

Dyed sewing thread of cotton-polyester core yarn with a metric number of 60/3 is prepared with this formulation. The pH of the liquor is adjusted with acetic acid to 5.5.

4. Testing the Material Treated with the Inventive Preparation

Tension values, measured as in Example 1, were 120±5 g. With the formulation of Example 1 of German Offenlegungsschrift No. 28 16 196, mentioned previously, tension values of 150±10 g are obtained.

A dip impregnation with a silicone oil emulsion corresponding to Example 1 of German Offenlegungsschrift No. 27 53 200, which is not substantive, gave tension values of 165±40 g.

EXAMPLE 3

1. Composition of the Water-Free Active Ingredients

| a | polydimethyl siloxane (5,000 mm$^2$/sec) | 20.0 weight % |
|---|---|---|
| b | slab paraffin, melting point 42°-45° C. | 64.0 weight % |
| c | oleic acid | 8.0 weight % |
| d | imidazolinium salt of the formula given in Example 1, with:<br>$R^3$ = undecyl; $X^\ominus$ = $Br^\ominus$ | 4.0 weight % |
| e | ethoxylated stearylamine (10 EO) | 4.0 weight % |

2. Production of the Inventive Preparation

The slab paraffin was melted and the components of the formulation were then mixed intimately.

The mixture was emulsified in twice the amount of hot (70° C.) water using a colloidal mill.

3. Application of the Inventive Preparation

Four different types of knitting yarns from different fiber material were prepared identically as follows:

The yarns were pre-rinsed in cross spool dyeing equipment at room temperature and at a pH which had been adjusted to 5.5 with acetic acid. The rinsing water was drained off and the dyeing apparatus was refilled with fresh water to which the preparation was added in an amount required for the desired actives add-on of 1% and whose pH was then adjusted to 4.5 with glacial acetic acid. While constantly circulating the liquor, the temperature was then raised to 55° C. within 20 minutes. After this process, the liquor was clear.

4. Testing the Treated Material

The dried yarns were tested for breaking strength and friction. The loss in breaking strength was 0% to a maximum of 5%, compared to 10% to 22% when using a substantive paraffin preparation of the prior art.

Coefficients, measured with a friction balance made by the Schlafhorst Company, Mönchengladbach, are summarized in the following table.

| Yarn Type | Thickness (Nm) | Coefficient of Friction | | |
|---|---|---|---|---|
| | | present invention | not of the invention | untreated |
| Polyester/Cotton | 50 | 0.18 | 0.21 | 0.28 |
| Cotton | 60 | 0.19 | 0.23 | 0.33 |
| polyacrylonitrile | 50 | 0.20 | 0.23 | 0.29 |
| Polyester/Wool | 60/2 | 0.19 | 0.22 | 0.30 |

EXAMPLE 4

The ready-for-use formulation described in Example 3, was applied using the process described in Example 3 at an add-on of 5% to plied cotton sewing thread of metric number 60/3.

The average breaking strength of the inventively prepared thread was ca. 750 g; a breaking force of only ca. 650 g was required to break a material prepared according to the state of the art. For untreated material, the value was ca. 800 g.

The running properties on the sewing machine were measured as described in Example 1. The following tension values were obtained:

| Comparison of the invention | 220–250 g |
|---|---|
| Comparison value (not of the invention) | 280–320 g |
| Untreated | 400–1000 g or thread breakage. |

EXAMPLE 5

1. Composition of the Water-Free Active Ingredient

| a | phenylmethylpolysiloxane oil (900 mm$^2$/sec) with 15 mole % of diphenylsiloxy units, | 60.0 weight % |
|---|---|---|
| $b_1$ | hard paraffin, melting range 60°-62° C. | 15.0 weight % |
| $b_2$ | partially saponified oxidized Fischer-Tropsch wax, dropping point 96-100° C. | 15.0 weight % |
| c | coconut oil fatty acid | 2.9 weight % |
| d | imidazolinium salt of the formula given in Example 1 with<br>$R^3$ = heptadecyl, $X^-$ = $CH_3COO^-$ | 7.1 weight % |

2. Production of the Inventive Preparation 2.1 Production of the Silicone Oil Emulsion:

Components (a), (c) and a third of component (d) are converted at 45° C. into an emulsion with a silicone content of 50%.

2.2 Production of the Wax Dispersion:

The waxes ($b_1$ and $b_2$) are emulsified under pressure with the rest of emulsifier (d) in a 3-fold amount of hot (100° C.) water.

2.3 The total amount of the two emulsions is mixed.

3. Application of the Inventive Preparation and Testing the Result Achieved

Polyester cut staple sewing thread of metric number 80/3, is prepared as described in Example 1.

With the thus treated thread, seam lengths of more than 40 cm can be attained even on 16 layers of cotton fabric according to the sewing test described in Example 1.

We claim:

1. A composition for substantively preparing yarns or plied yarns comprising an oil/water dispersion, the water portion of which contains
   (a) from about 5 to 80 weight percent of silicone oil having a viscosity of 500 to 50,000 mm$^2$/sec at 25° C.,
   (b) from about 10 to 80 weight percent of wax with a melting point of not less than about 40° C.,
   (c) from about 1 to 10 weight percent of fatty acids having 6 to 22 carbon atoms,
   (d) from about 0.4 to 12 weight percent of cationic imidazolinium salts, and
   (e) from about 0 to 10 weight percent of ethoxylated fatty amines,
the sum of components (a) to (e) adding up to 100 weight percent.

2. The composition of claim 1 wherein component (a) has a viscosity of from about 1,000 to 10,000 mm$^2$/sec at 25° C.

3. The composition of claim 1 or 2 wherein component (b) has a melting point higher than about 60° C.

4. The composition of claim 1 or 2 wherein the silicone oil is a methyl silicone oil.

5. The composition of claim 1 or 2 wherein the silicone oil is a methyl silicone oil having a portion of the methyl group replaced by alkyl or phenyl groups.

6. The composition of claim 1 or 2 wherein the silicone oil has trimethylsilyl or dimethyl hydroxysilyl groups.

7. The composition of claim 1 or 2 wherein the amount of silicon oil is from about 50 to 85 weight percent.

8. The composition of claim 1 or 2 wherein the amount of silicone oil is from about 70 to 80 weight percent.

9. The composition of claim 1 or 2 wherein the amount of silicone oil is from about 5 to 20 weight percent.

10. The composition of claim 1 or 2 wherein the amount of silicone oil is from about 8 to 12 weight percent.

11. The composition of claim 1 or 2 wherein the wax has a melting point of more than about 60° C.

12. The composition of claim 1 or 2 wherein the wax has a melting point from about 50° to 60° C.

13. The composition of claim 1 or 2 wherein the the fatty acid is selected from the group consisting of caproic acid, lauric acid, oleic acid, stearic acid, behenic acid, hydroxystearic acid, isotridecanoic acid.

14. The composition of claim 1 or 2 wherein the imidazolinium salt has the formula $$R^4-N\underset{\underset{R^3}{|}}{\overset{\overset{CH_2-CH_2}{|\qquad\quad|}}{\diagdown C \diagup}}N^{\oplus}-R^5 . X^{\ominus}$$

wherein
$R^3$ is a long chain hydrocarbon radical having 10 or more carbon atoms;
$R^4$ is hydrogen or alkyl having from 1 to 5 carbon atoms;
$R^5$ is lower alkyl; and
X is an anionic radical.

15. The composition of claim 1 or 2 wherein the ethoxylated fatty amine contains from 10 to 22 carbon atoms.

16. A method for the preparation of a composition for substantively preparing yarns or plied yarns composed of an oil/water dispersion, the water portion of which contains
   (a) from about 5 to 80 weight percent of silicon oil having a viscosity of 500 to 50,000 mm$^2$/sec at 25° C.,
   (b) from about 10 to 80 weight percent of wax with a melting point of not less than about 40° C.,
   (c) from about 1 to 10 weight percent of fatty acids having 6 to 22 carbon atoms,
   (d) from about 0.4 to 12 weight percent of cationic imidazolinium salts, and
   (e) from about 0 to 10 weight percent of ethoxylated fatty amines,
the sum of components (a) to (e) adding up to 100 weight percent, comprising
   (I) emulsifying the silicone oil with a portion of the fatty acids and a portion of the cationic imidazolinium salt;
   (II) emulsifying the wax with the remaining portion of the fatty acids and the remaining portion of the imidazolinium salt; and then
   (III) mixing emulsions (I) and (II) together.

17. The method of claim 16 wherein the wax is first melted and then mixed with remaining portions of the imidazolinium salts.

18. The method of claim 16 wherein the fatty acid is oleic acid.

19. The method of claim 16 or 17 wherein the fatty acid is stearic acid.

* * * * *